United States Patent [19]

Lucas

[11] 3,964,067
[45] June 15, 1976

[54] GLIDE PATH SIGNAL TRANSMISSION SYSTEM

[76] Inventor: James Godfrey Lucas, 12, Woniora Ave., Wahroonga, N.S.W. 2076, Australia

[22] Filed: Oct. 23, 1974

[21] Appl. No.: 517,303

Related U.S. Application Data

[63] Continuation-in-part of Ser. No. 295,931, Dec. 4, 1974, abandoned.

[30] Foreign Application Priority Data

Oct. 11, 1971 Australia............................. 6592/71

[52] U.S. Cl............................. 343/108 R; 343/853
[51] Int. Cl.² ....................... G01S 1/16; G01S 1/18
[58] Field of Search..................... 343/108, 853, 854

[56] References Cited
UNITED STATES PATENTS

| | | | |
|---|---|---|---|
| 3,409,890 | 11/1968 | Redlich | 343/108 |
| 3,460,144 | 8/1969 | Hannan | 343/777 |

Primary Examiner—Maynard R. Wilbur
Assistant Examiner—T. M. Blum
Attorney, Agent, or Firm—Robert E. Burns; Emmanuel J. Lobato; Bruce L. Adams

[57] ABSTRACT

An aircraft glide path signal transmission system is provided with an antenna comprising two overlapping arrays which are in turn constituted by a number of antenna elements disposed in a vertical direction, with some of the elements of each array common to the two arrays. The elements which are unique to the respective arrays are fed with separate drive signals and the elements which are common to the respective arrays are fed with a combination of the drive signals.

3 Claims, 8 Drawing Figures

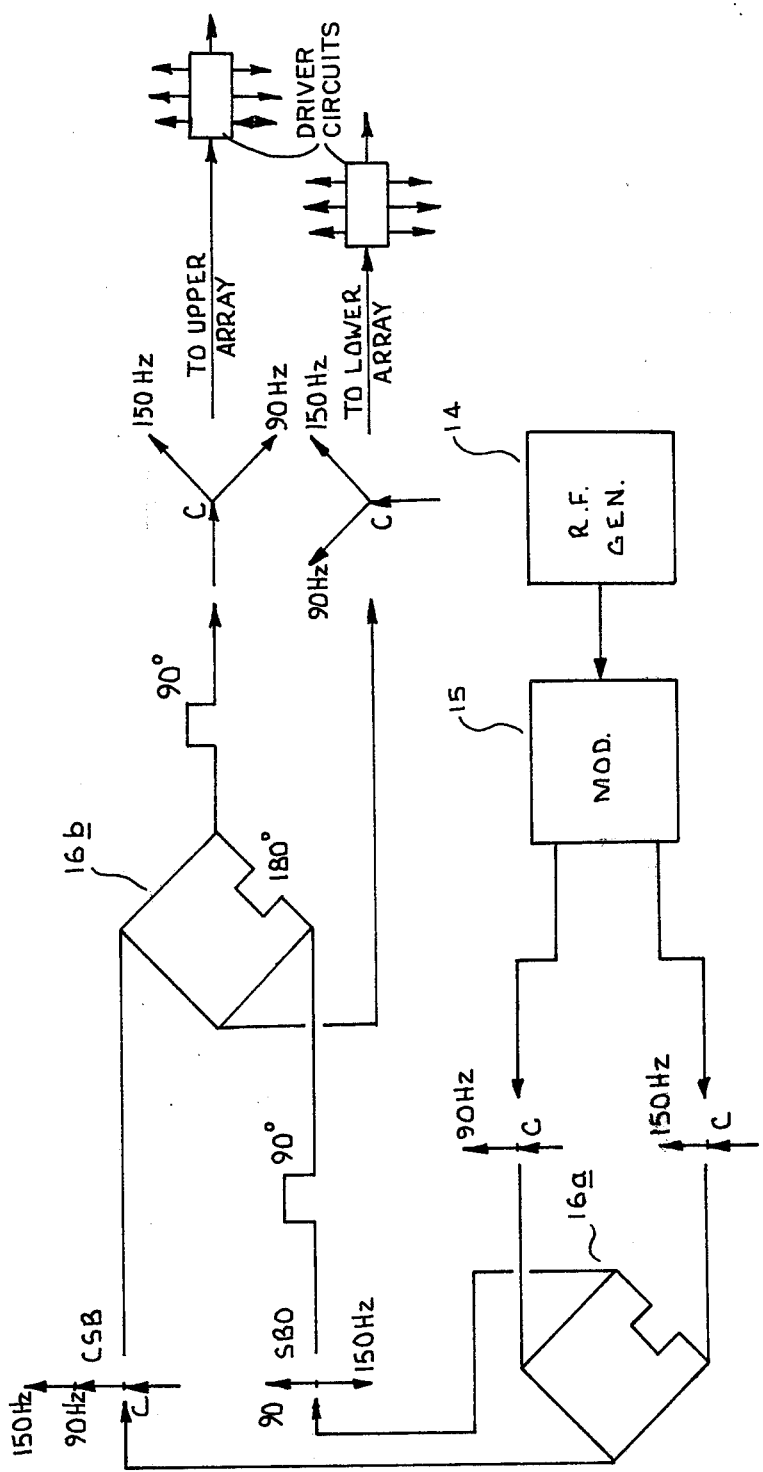

GLIDE PATH SIGNAL TRANSMISSION SYSTEM

This application is a continuation-in-part of my earlier application Ser. No. 295,931 which is now abandoned.

FIELD OF THE INVENTION

This invention relates to a glide path signal transmission system for aircraft.

STATE OF THE ART

A glide path system of the type described and claimed in U.S. Pat. No. 3,409,890 is known in the art and referred to herein by way of reference. More, particularly U.S. Pat. No. 3.409,890 disclosed a phase reference glide path system which comprises:

a. means for producing two transmission signals, one being a carrier signal which is modulated with signals having frequency $f_1$ and $f_2$ and the other being a sideband signal constituted by phase separated signals having the frequencies $f_1$ and $f_2$, and b. an antenna for transmitting the modulated carrier and sideband signals, the antenna comprising an (upper) sideband antenna array for transmitting the sideband signal and a separate (lower) carrier antenna array for transmitting the carrier signal. The antenna arrays are arranged with vertically aligned elements which are driven with a distribution of signal currents in such a manner as to substantially obviate ground reflections of the transmitted rediation within an aircraft guidance region, and the arrays have their centres separated to cause the phase difference between the transmitted carrier and sideband signals to increase with elevation.

With this system the elevation of an aircraft receiving the signals within the guidance region may be derived, a resultant received signal having a predominant frequency $f_1$ occurring above the glide path angle.

The antenna structure as described in the above referenced Patent is constituted by seven elements in the respective upper and lower (sideband and carrier) arrays, the arrays being in vertical alignment and overlapping to such an extent that the centre of one array is separated from the centre of the other by a distance equivalent to approximately five wave-lengths. Each element comprises a single array of three dipoles mounted upon a corner reflector.

The antenna structure described in the above referenced U.S. Pat. No. 3,409,890 might also be employed in a null reference glide path system which is hereinafter described.

However, the known antenna structure (as, or when, employed in either the phase reference and null reference modes) has certain disadvantages or problems. For example, it comprises a large number of radiating elements (typically 14 corner reflector bays with three dipoles per bay), and each corner reflector bay is restricted to having short sides and a small front aperture. The latter problem flows from the spacing required of the bays and it gives rise to the following effects:

a. Each bay is a very inefficient radiator of electromagnetic energy and has low gain.

b. Large mutual coupling effects occur between adjacent bays, particularly in the overlap region of the two seven-element arrays.

c. The radiating dipoles must necessarily be close to the corner of the small bays, which results in a reactive impedance at the input to the bays. This has been countered by making the dipoles approximately 0.75 × half wavelength rather than the usual 0.95 × half wavelength for resonance. As a result, the bay is extremely critical to any change in shape (even due to wind loading) which cause changes in the input impedance. U.S. Pat. No. 3,460,144, also inserted herein by way of reference, teaches the use in an essentially monopulse radar system, of couplers to select groups of aerial horns in symmetrical aerial array in order to obtain from the aerial horns meaningful information relating, selectively, to the range, bearing and elevation of a target irradiated by pulses of radiation and within the field of view of the array. U.S. Pat. No. 3, 460,114 teaches the provision of independant control in the plurality of modes of operation having a plurality of horns arranged symmetrically about the horizontal and vertical axes. A group of hybrid junctions are coupled to the outputs of the horns to obtain preliminary sum and difference comparisons. The preliminary sum and difference comparison signals are coupled to a plurality of directional couplers in order to selectively combine portions of these preliminary signals to form each operating mode of the antenna in order to effectively change the size of the array for each mode. For example, in a monopulse antenna, a different effective antenna size is provided for the sum mode and the elevation and azimuth difference modes.

OBJECT OF THE INVENTION

The present invention seeks to provide a glide path signal transmission system for aircraft whereby the aircraft, by monitoring a continuous received transmission, can tell whether correction to its flight path is necessary in order to make a correct airfield approach.

THE INVENTION

In accordance with the present invention there is provided a glide path signal transmission system for indicating to an aircraft a predetermined glide path within an aircraft guidance region, comprising carrier wave radio frequency generating means for generating a carrier wave, modulating means connected to modulate the carrier wave and to provide at a first output terminal a first modulated signal comprising the carrier wave modulated with a first modulating frequency and to provide at a second output terminal a second modulated signal comprising the carrier wave modulated with a second different modulating frequency, and hybrid signal combining means connected to receive said first and second modulated signals and to provide from them two different output signals having a predetermined relationship to one another and in each of which a constant but different relationship exists between said modulating frequencies. An antenna arrangement comprises a first antenna array for receiving signals from first signal drive means which are connected to be fed with one of said two different output signals, and a second antenna array overlapping the first antenna array and connected to be fed by a second signal drive means which is supplied with the second of said two different output signals, said arrays having their centres separated in a vertical direction and being individually constituted by antenna elements of which a predetermined number are common to both arrays.

During operation of said transmission system, each of said signal drive means supplies the elements of the associated array with a distribution of signal currents in such manner as to substantially obviate reflected radiation of the transmitted radiation within said aircraft guidance region, and said elements unique to the first and second arrays are fed by their respective drive means with first and second drive signals respectively whereas the elements which are common to the arrays are fed with a combination of signals from said drive means.

With the antenna arrangement of the invention a total of eleven elements may be employed, including three common elements, instead of the prior art arrangement of fourteen separate elements.

Advantages of this system are, for a small increase in the overall height of the antenna structure:

1. The front aperture of each bay may be increased, typically from 0.75 wavelengths to 1.5 wavelengths. This allows standard corner reflector design to be used which results in an increase of at least 6 dB in individual bay gain. Hence, whereas three dipoles per bay were required in the previous arrangement in order to provide efficient on-course signal, two or even one dipole per bay may be employed if azimuth directivity is not necessitated.

2. The interbay mutual coupling is reduced to an infinitesimal level, and it is known that undesirable ground image effects which have been experienced with the previously described arrangement are correspondingly reduced.

3. The spacing between array centres is increased from 5.25 wavelengths to six wavelengths, which allows for more efficient control of the path width, in that the lower array signal need not be attenuated to the same extent.

4. Matching of the elements is facilitated and each bay may be subjected to minor physical perturbations without change in the feed impedance of the bay.

BRIEF DESCRIPTION OF THE DRAWINGS

The invention will be more fully understood from the following description of a preferred embodiment thereof taken in conjunction with the accompanying drawings wherein, FIG. 2 is a schematic illustration of the drive arrangement and showing the relationship of signals which are delivered to the antenna arrays, with the system being driven for operation in the null reference mode.

DESCRIPTION OF PREFERRED EMBODIMENT

Figure 1:
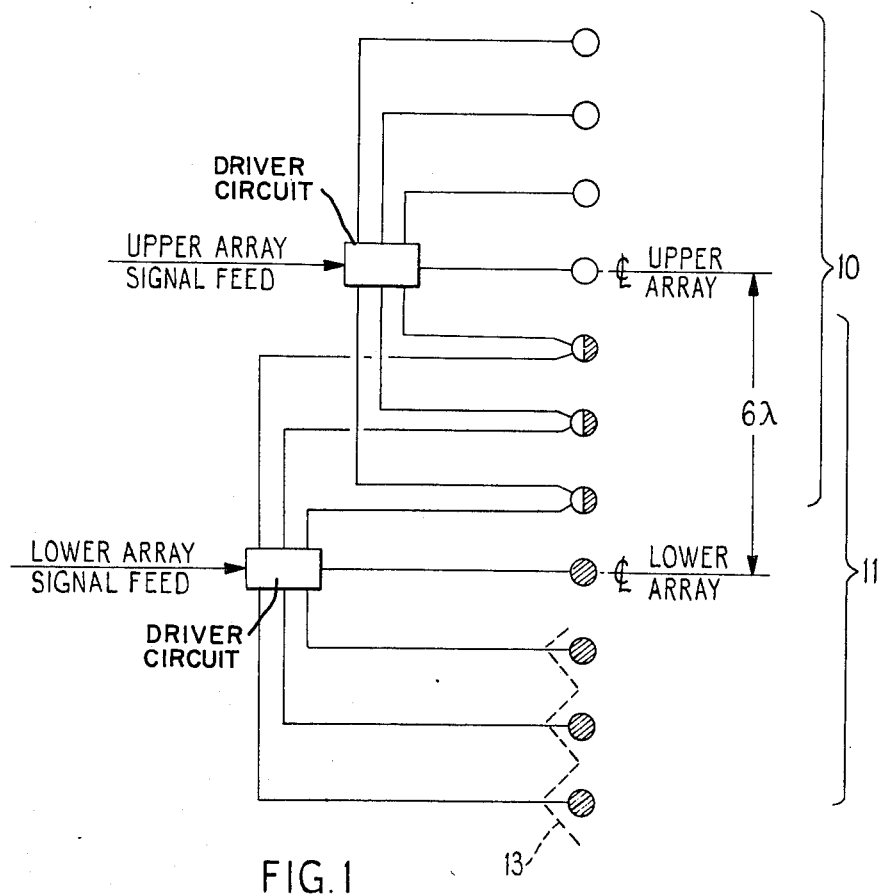
FIG. 1 shows, in a schematic manner, an antenna arrangement and feed connections therefor, such antenna arrangement being appropriate to both a phase reference and a null reference glide path signal transmission system.
Figure 1A:
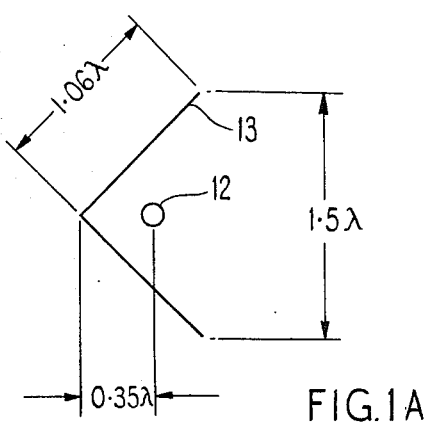
FIG. 1A is a schematic illustration of a typical bay element as employed in the antenna arrangement of FIG. 1.

As is shown in FIG. 1 of the drawings, the antenna arrangement comprises a first (upper) array of elements 10 and a second (lower) array of elements 11. The elements of both arrays are arranged in a vertical direction and their respective centres are separated by a distance equivalent to six-wavelengths. Each element of the arrays is constituted by at least one dipole 12 which is mounted within a corner reflector 13 as shown in FIG. 1A.

Each of the arrays comprises effectively seven elements, four of which are unique to the respective arrays and three of which are common to both arrays; this making a total of eleven elements in the antenna arrangement.

The elements which are unique to the first and second arrays are fed with first and second drive signals respectively, and the elements which are common to the two arrays are fed with a combination of the drive signals.

Figure 6:
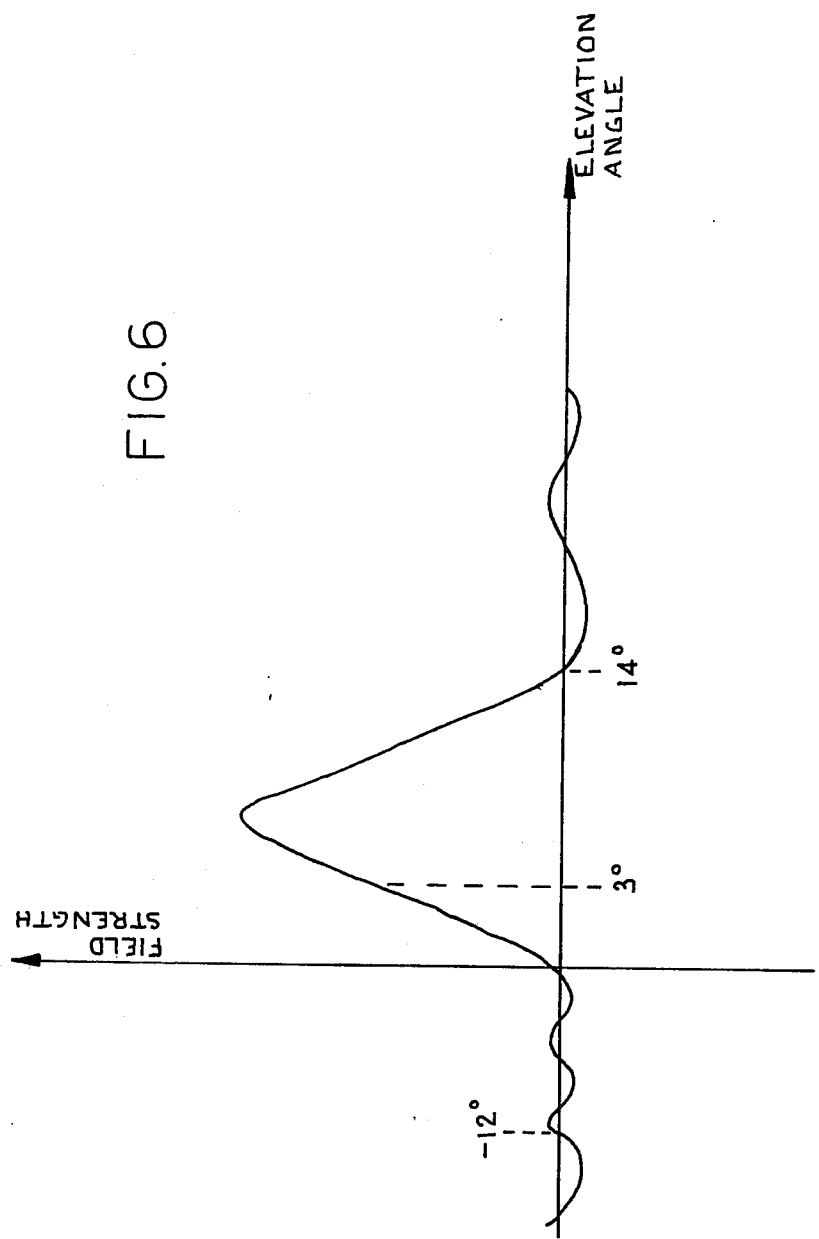
FIG. 6 shows a radiation pattern which is produced by the antenna arrangement of FIG. 1, when driven in either the null reference or the phase reference mode.
Figure 7:
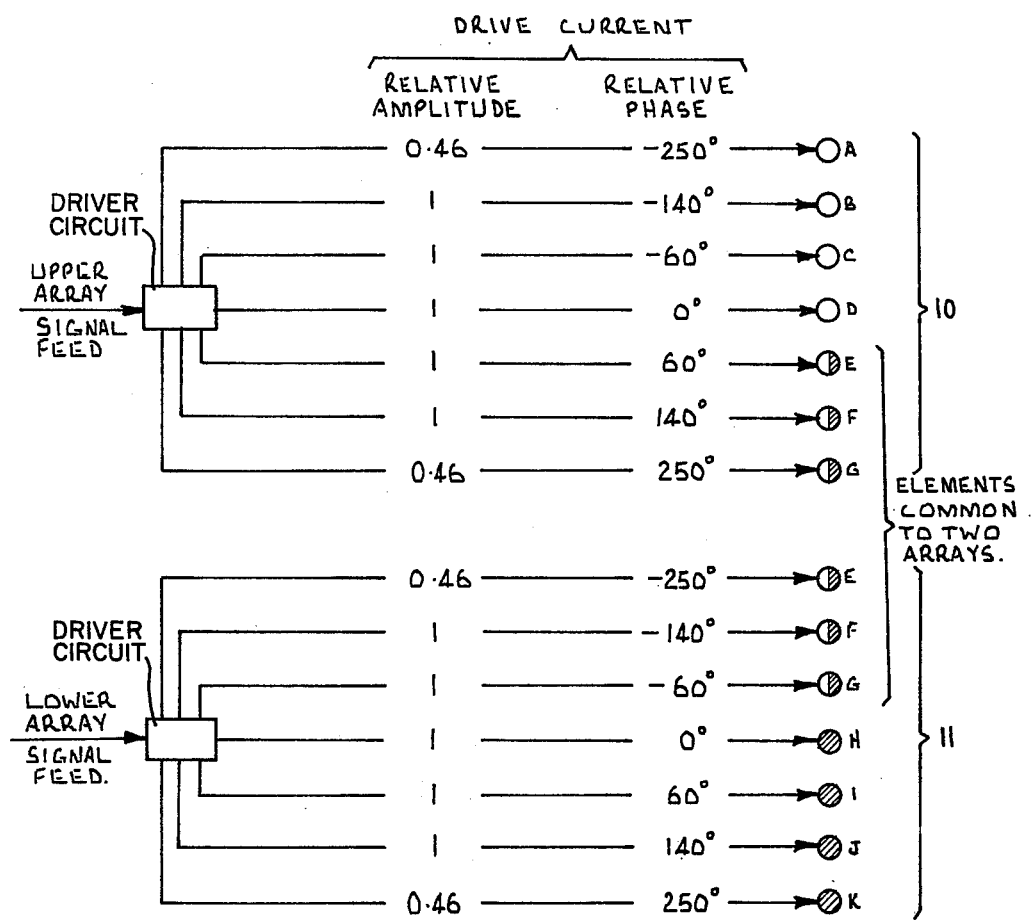
FIG. 7 shows the relationship of phase and amplitude of drive currents which are delivered to the respective elements of the antenna arrays in order to achieve the radiation pattern shown in FIG. 6.

The two arrays of the antenna are driven by driver circuits with a distribution of currents which results in the radiation pattern as shown in FIG. 6, whereby ground reflections (i.e., image radiation) into an aircraft guidance region are substantially obviated. To achieve such a radiation pattern the phase difference between the drive currents fed to the respective array elements and the amplitude of such currents is selected in accordance with standard array design practice, a typical phase and amplitude relationship between the respective drive currents being shown in FIG. 7 of the drawings.

As is stated in the abovementioned U.S. Pat. No. 3,490,890, the fact that image radiation can be obviated results from the discovery that, in the absence of ground reflections, the amplitude of signals radiated from two identical vertically-separated antenna arrays does not vary with elevation angle but, rather, the relative phase between the radiated signals does vary with elevation angle. Therefore, by driving the antenna in such a way that the signals radiated from the upper and lower arrays have a predetermined phase relationship at a selected elevation or glide path angle, an aircraft which enters the guidance region may "look for" the predetermined phase relationship and follow the glide path angle determined thereby.

OPERATION OF PREFERRED EMBODIMENT IN THE NULL REFERENCE MODE

Referring to FIG. 2, a signal from an R.F. generator 14 is fed to a modulator 15 from which two signals are derived at respective terminals, the first signal comprising a carrier plus the sideband of a 90 Hz modulated wave, and the second signal comprising the carrier plus a sideband of a 150 Hz modulated wave. The two derived signals are combined in a following hybrid device 16a from which signals which are termed CSB and SBO are derived. The CSB signal comprises the carrier plus sidebands of a 150 Hz and a 90 Hz modulated wave, and the SBO signal comprises only phase-separated sidebands of the 150 Hz and 90 Hz modulated waves.

The CSB and SBO signals are combined in a further hybrid device 16b and resultant signals having the phase relationships as shown in FIG. 2 are fed to the respective (upper and lower) arrays of the antenna structure shown in FIG. 1.

Figure 3:
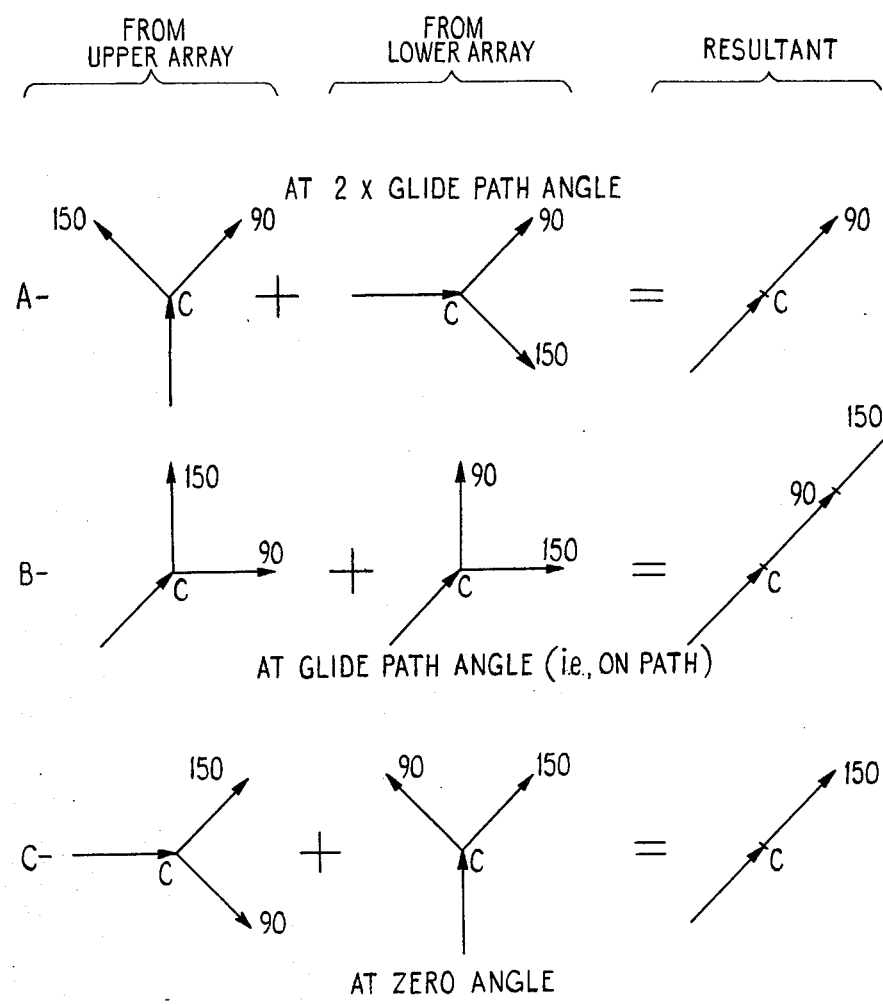
FIG. 3 shows the signal phasor relationships at various elevations of the (total) radiated field, when the system is driven for operation in the null reference mode.

As above mentioned, the various elements of the two arrays are driven by suitable driver circuits so as to produce the field in space as indicated in FIG. 6, such field having signal components having the relationships shown, for various elevation angles, in FIG. 3. Thus, with reference to FIGS. 3A and 3C, an aircraft flying above or below the optimum glide path angle will receive a signal having a predetermined frequency of either 90 Hz or 150 Hz and, as indicated in FIG. 3B, an aircraft flying on path will receive equal signal components of both frequencies.

OPERATION OF THE PREFERRED EMBODIMENT IN THE PHASE REFERENCE MODE

Figure 4:
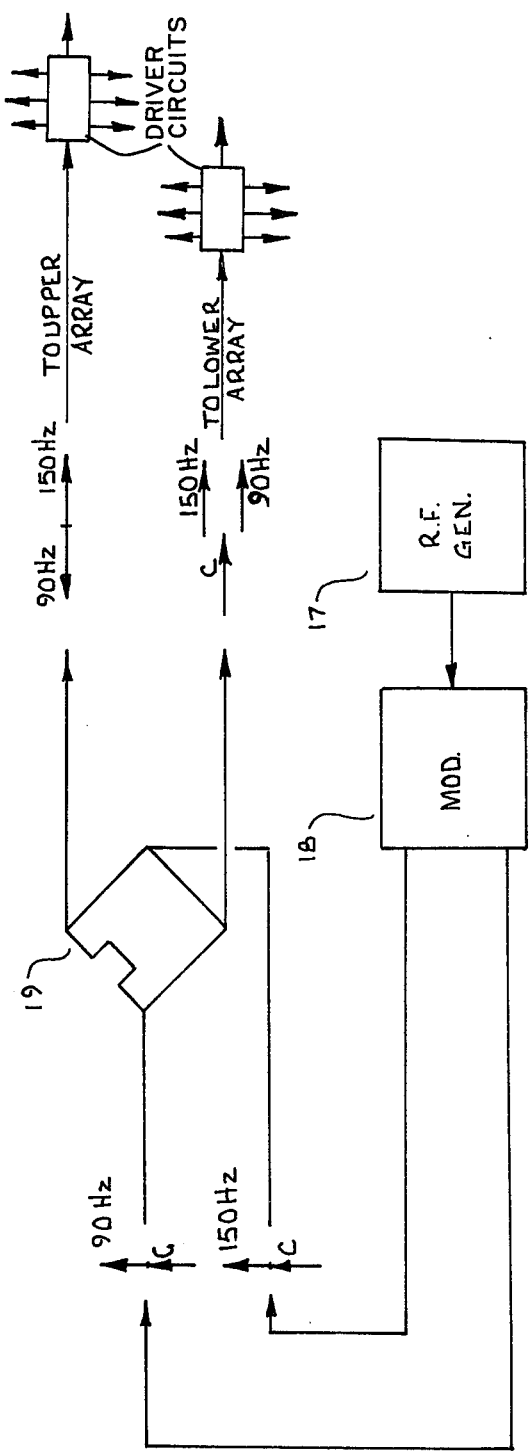
FIG. 4 is a schematic illustration of the drive arrangement and showing the relationship of signals which are delivered to the antenna arrays, with the system being driven for operation in the phase reference mode.
Figure 5:
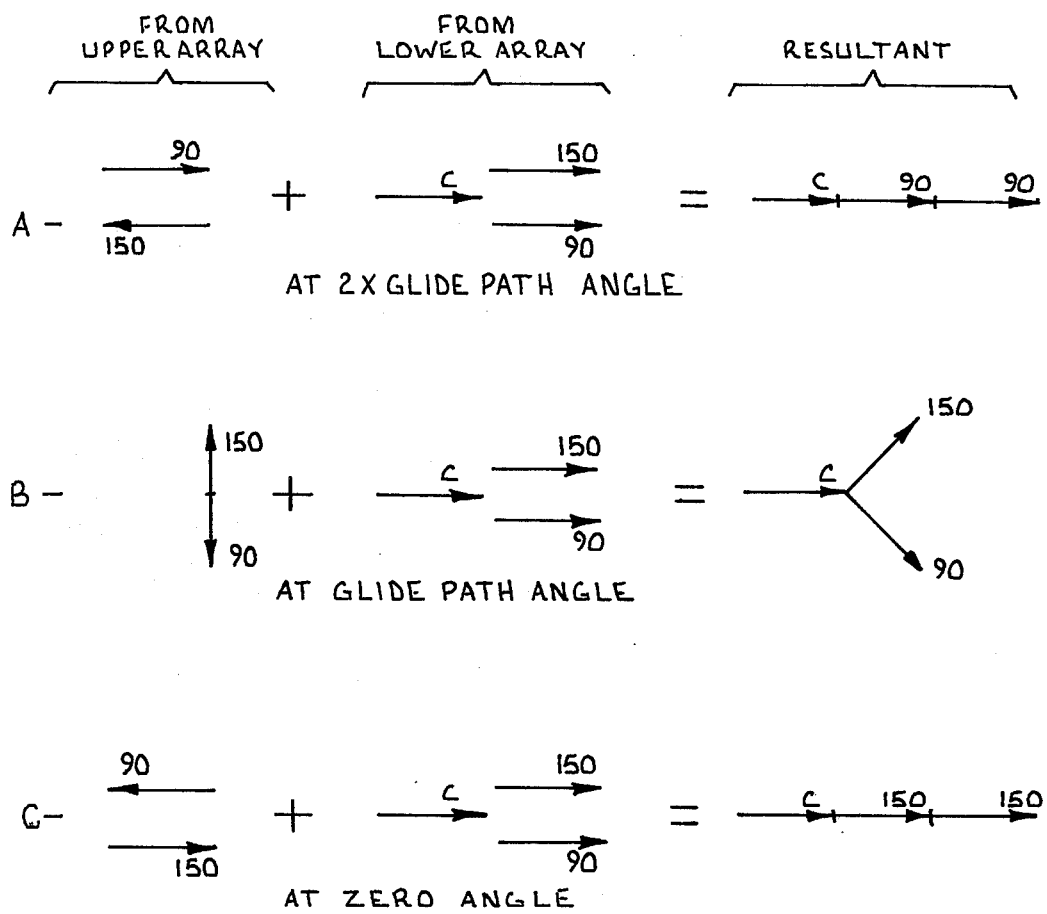
FIG. 5 shows the signal phasor relationships at various elevations of the (total) radiated field, when the system is driven for operation in the phase reference mode.

When the antenna is driven in the phase reference mode, as represented by FIGS. 4 and 5, a signal from an R.F. generator 17 is fed to a modulator 18 from which two signals are derived. The first signal comprises a carrier plus the sideband of a 90 Hz modulated wave, and the second signal comprises the carrier plus a sideband of a 150 Hz modulated wave. The two derived signals are combined in a following hybrid device 19 and resultant signals are fed to the respective (upper and lower) arrays of the antenna structure. The signal which is fed to the upper array comprises only phase-separated sidebands of the 90 Hz and 150 Hz modulated waves, and the signal which is fed to the lower array comprises carrier plus sidebands of the 150 Hz and 90 Hz modulated waves.

FIG. 5 shows the relationship of the signal components of the radiated field, with the antenna being driven in the phase reference mode as above described. Thus, with reference to FIGS. 5A and 5C, an aircraft flying above or below the optimum glide path angle will receive a signal having a predominant frequency of 90 Hz or 150 Hz and, as shown in FIG. 5B, an aircraft flying on path will receive equal signal components of both frequencies.

In the aircraft, a receiver tuned to the carrier frequency receives radiation from the antenna and separates the 90 Hz and 150 Hz signals (if both are present) by means of filters, the filter outputs then being fed to separate terminals of an indicating meter. While the aircraft follows the optimum glide path, the two inputs to the meter will cancel and the needle remains stationary. However, should the aircraft fly below the optimum path, the 150 Hz signal input will predominate and the needle will be displaced in one direction. Similarly, the aircraft flying above the optimum glide path will result in the 90 Hz signal input being predominant, thus causing the needle to be deflected in the other direction.

The above described signal reception system is compatible with the transmission system when driven in both the null reference and phase reference modes.

I claim:

1. A glide path signal transmission system for indicating to an aircraft a perdetermined glide path within an aircraft guidance region comprising: carrier wave radio frequency generating means for generating a carrier wave; modulating means connected to receive and modulate the carrier wave and to provide at a first output terminal a first modulated signal comprising the carrier wave modulated with a first modulating frequency and to provide at a second output terminal a second modulated signal comprising the carrier wave modulated with a second different modulating frequency; hybrid signal combining means connected to receive said first and second modulated signals and to provide from them two different output signals having a predetermined relationship to one another and in each of which a constant but different relationship exists between said modulating frequencies; first signal drive means connected to receive one of said two different output signals and second signal drive means connected to receive the other of said two different output signals and to develop therefrom a distribution of signal currents; and an antenna arrangement comprising a first antenna array connected to receive signal currents from said first signal means, a second antenna array connected to receive signal currents from said second signal drive means, said antenna arrays having their centres separated in a vertical direction and being individually constituted by antenna elements of which a predetermined number are common to both arrays such that each of said signal drive means supplies the elements of its associated array with a distribution of signal currents in such manner as to substantially obviate reflected radiation of the transmitted radiation within said aircraft guidance region, and said elements unique to the first and second arrays are fed by their respective drive means with first and second drive signals respectively whereas the elements which are common to the two arrays are fed with a combination of signals from said drive means.

2. A transmission system as set forth in claim 1, in which eleven antenna elements are provided and three of them are common to said two antenna arrays.

3. A system as claimed in claim 1, in which each element of each array comprises at least one dipole mounted within a corner reflector.

* * * * *